July 5, 1960 A. C. SAMPIETRO 2,943,851
ELECTRIC CONTROL SYSTEM FOR FLUID SPRINGS
Filed Sept. 6, 1955
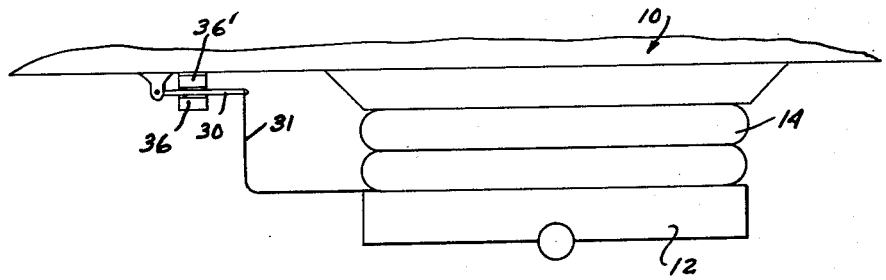
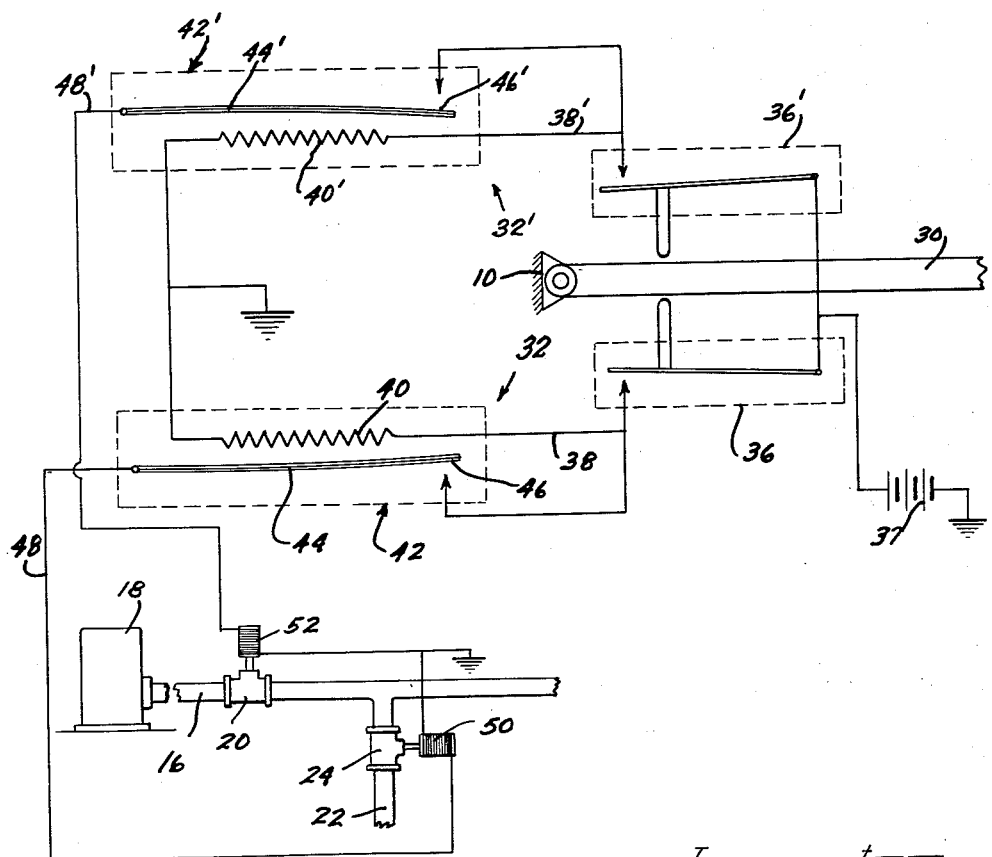
Inventor
ACHILLES CHARLES SAMPIETRO United States Patent Office 2,943,851
Patented July 5, 1960

2,943,851

ELECTRIC CONTROL SYSTEM FOR FLUID SPRINGS

Achilles Charles Sampietro, Ann Arbor, Mich., assignor to Thompson Products, Inc., Cleveland, Ohio, a corporation of Ohio Filed Sept. 6, 1955, Ser. No. 532,708

1 Claim. (Cl. 267—65)

This invention relates to pneumatic springs for vehicles and the like. Such springs obtain their resiliency from a bladder inflated with a fluid such as air under pressure, and a valve device is normally provided to control the pressure in the bladder in response to change in the spacing between the axle and frame of the vehicle. That spacing varies according to several factors, such as vehicle load, effect of road crown on load tilt, road bumps, etc. It is with the control means which regulates the inflation of the bladder of a pneumatic spring system that this invention is primarily concerned.

It is an object of this invention to provide a control means for pneumatic springs which will minimize the consumption of compressed air on bumpy roads.

More specifically, it is an object of this invention to provide a means which will vary bladder pressure in response to changes in axle-to-frame spacing as caused by sustained loads, but which will maintain that pressure constant in response to change in axle-to-frame spacing as caused by force or loads of temporary duration such as road bumps and the like.

A further object of my invention is to provide a new and improved system for controlling bladder pressure, including in the air inlet system an electric circuit involving a delay arrangement which will render the air control means inoperative except for loads and forces of a duration more than a predetermined minimum interval, which will be of simple and economical construction, and which will require little servicing during long periods of continued use.

In carrying out my invention in a preferred embodiment to attain the above and other objects, I mount on the frame of a vehicle a control arm movable in response to the spacing between the frame and the axle of the vehicle. From an intermediate normal position, the control arm is movable to engage and actuate upper and lower electric switches. Through time delay relays, desirably of thermal type, those switches are connected to solenoids which respectively actuate control valves to either admit air to the bladder of the spring system or vent air from the bladder to the atmosphere. The electric control system involving the time delay relays provides that the control valve will be actuated in response to sustained load conditions, but will be ineffective to actuate the control valve in response to loads of only a temporary duration such as road bumps and the like.

A preferred embodiment of my invention is illustrated by the accompanying drawing, in which:

Figure 1 is a somewhat diagrammatic view showing frame, pneumatic spring, and axle of a vehicle for which my control system is adapted to be associated; and Figure 2 is a schematic view illustrating a control system according to my invention.

As shown in the drawings:

As shown in Figure 1, a vehicle frame 10 is supported on an axle system 12 through the medium of pneumatic bladders 14 which serve as springs for the vehicle. Compressed air is supplied to each bladder 14 through a conduit 16 from an air compressor 18 carried by the vehicle, and an air inlet valve 20 controls flow in conduit 16. A vent line 22 communicates the air conduit 16 with the atmosphere from a point in conduit 16 between the inlet valve 20 and the bladder 14, and in that vent conduit 22 is a vent valve 24. By means yet to be described, the air inlet valve 20 and the air vent valve 24 are operated to control the inflation pressure of the bladders 14 of the pneumatic spring system.

To obtain the desired response to certain load conditions, there is pivotally carried by the vehicle frame 10 a control arm 30 adapted to respond to load conditions by being operatively linked to an axle system member by linkage 31 shown carried by the vehicle axle system 12. Thus the control arm 30 is swung and is positioned in accordance to the spacing between the vehicle frame 10 and the vehicle axle 12. In the embodiment shown, the control arm 30 is swung and positioned counterclockwise in accordance with a reduction in the spacing between the vehicle frame 10 and the vehicle axle 12, and is swung and positioned clockwise in accordance with an increase in such spacing. If the control arm is displaced in either direction more than a predetermined amount, it is adapted to actuate vent-control means 32 or air-admission control means 32', as will now be described. Suppose there has been a reduction in the effective loading of the vehicle, for example, and the spacing between the frame 10 and the axle 12 has increased. This will cause the control arm 30 to swing downwardly, whereupon, in the embodiment shown, it actuates and closes a micro switch 36 of the vent-control means 32. As shown, closing switch 36 effects energization of an electric circuit from an associated voltage source such as battery 37, through a wire 38 to the heater 40 of a time delay relay 42. That relay also contains a temperature responsive element 44 such as the bi-metal strip shown. The arrangement is such that when the heater has operated long enough to cause movement of a temperature-responsive element 44, which can happen only in response to a prolonged condition of vehicle load, an electric contact 46 mounted on the latter comes into contact with a contact of primary circuit 38. This establishes a secondary circuit 48 in which is connected a control means such as the solenoid 50 shown. The solenoid 50 in the illustrated embodiments is the means which activates the vent valve 24 to vent air from the bladder 14 to reduce the inflation pressure of the bladder. When sufficient air has been vented from bladders 14 to cause control arm 30 to move back to its intermediate position, the vent 24 closes in response to opening of switch 36.

Thus it is seen that the vent control means 32, including switch 36, wire 38, relay 42, wire 48 and solenoid 50 is effective when actuated by prolonged downward position of control arm 30 to actuate valve 24 to vent air from the bladder 14.

An air admission control means 32' is provided, and in the embodiment shown includes parts corresponding to those of the vent-control means just described. Thus the air-admission control means 32', includes a switch 36', circuit 38'—40' in which is included a time delay relay 42' having a heater 40', bi-metal strip 44', and a contact 46', and a solenoid 52 which operates the air valve 52. It will be apparent that this system is effective to admit air to the bladders 14 in response to a prolonged upward position of control arm 30.

In the operation of a vehicle embodying an electric control system for pneumatic springs according to my invention any change in net axle load will cause control arm 30 to be displaced either in an upward or a downward direction, depending on whether the load causes a decrease or increase in the axle-to-frame spacing. If the control arm 30 is displaced more than the predetermined minimum required to activate the associated micro switch 36—36' that switch is closed and the heater element of the associated time delay relay 42—42' begins to heat. If that load condition is sustained for an interval long enough to maintain the heater energized beyond the delay period of the relay, the associated solenoid valve 50—52 is energized to either to admit air to the pneumatic spring or vent it therefrom.

As a vehicle so equipped travels along a bumpy road, the control arm 30 successively moves both upwardly and downwardly in response to the road irregularities, successively closing and opening the respective time delay relay heater circuits. However, because of the time delay involved in heating the thermal-responsive elements 44—44' sufficient to cause them to close the secondary circuit which controls the solenoid arrangement which actuates the associated air control means, road bumps are of an insufficient time duration to actuate the air control means. Thus, consumption of compressed air on rough or bumpy roads is kept to a minimum. Yet the system is effective to provide the automatic spring-inflation control to compensate for sustained load conditions.

It will thus be seen from the foregoing description of my invention according to a preferred embodiment, considered in conjunction with the accompanying drawing, that the present invention provides a new and improved electric pressure-control system for fluid springs, which has the desired advantages and characteristics, and accomplishes its intended objects, including those hereinbefore pointed out and others which are inherent in the invention as described.

It will be understood that modifications and variations may be effected without departing from the scope of the novel concepts of the present invention.

I claim as my invention:

Apparatus for controlling the inflation pressure of a pneumatic spring system which resiliently interconnects relatively movable frame and axle members, comprising air control valve means regulating the inflation pressure of said pneumatic system, means responsive to the spacing between said relatively movable members for controlling operation of said valve means, said controlling means including first and second electric circuits, first switch means energizing the first circuit instantaneously upon relative movement of said members in one direction away from a neutral position and second switch means energizing the second electrical circuit upon relative movement of said members in the opposite direction away from the neutral position, each of said circuits including a time delay relay having a heater and a temperature-responsive element fixedly secured relative to said frame member and operative to energize an output circuit through the relay when heated by said heater, said output circuits when energized being adapted respectively to cause either admission of air to said pneumatic means or venting of air from said pneumatic means, deenergization of the respective circuits operating to close their respective valve means instantaneously upon reverse relative movement between said first and second members positioning them in said neutral position.

References Cited in the file of this patent

UNITED STATES PATENTS

| | | |
|---|---|---|
| 2,361,575 | Thompson | Oct. 31, 1944 |
| 2,506,726 | Magrum | May 9, 1950 |
| 2,608,999 | Wheeler | Sept. 2, 1952 |
| 2,670,201 | Rossman | Feb. 23, 1954 |
| 2,681,177 | Hartwell | June 15, 1954 |
| 2,735,644 | Bishofberger | Feb. 21, 1956 |
| 2,853,310 | Allison | Sept. 23, 1958 |

FOREIGN PATENTS

| | | |
|---|---|---|
| 617,565 | Great Britain | Feb. 8, 1949 |